United States Patent
Moon et al.

(10) Patent No.: US 9,576,715 B2
(45) Date of Patent: Feb. 21, 2017

(54) DEVICE FOR MAGNETIZING RING-SHAPED MAGNET FOR BLDC MOTOR

(71) Applicant: COAVIS, Sejong-si (KR)

(72) Inventors: Seong Hwan Moon, Daejeon (KR); Wan Sung Pae, Daejeon (KR); In Seok Sohn, Cheongju-si (KR)

(73) Assignee: COAVIS, Sejong (KR)

( * ) Notice: Subject to any disclaimer, the term of this patent is extended or adjusted under 35 U.S.C. 154(b) by 0 days.

(21) Appl. No.: 14/729,911

(22) Filed: Jun. 3, 2015

(65) Prior Publication Data
US 2015/0380146 A1 Dec. 31, 2015

(30) Foreign Application Priority Data

Jun. 25, 2014 (KR) .................... 10-2014-0078274

(51) Int. Cl.
*H01F 13/00* (2006.01)
*H02K 15/03* (2006.01)

(52) U.S. Cl.
CPC ............ *H01F 13/003* (2013.01); *H02K 15/03* (2013.01)

(58) Field of Classification Search
CPC ...... H01F 13/003; H02K 1/2706; H02K 15/00
See application file for complete search history.

(56) References Cited

U.S. PATENT DOCUMENTS

| | | | | |
|---|---|---|---|---|
| 4,354,218 A * | 10/1982 | Steingroever | ............ | H01J 9/44 335/212 |
| 7,560,841 B2 * | 7/2009 | Honkura | ............... | H01F 7/0273 310/154.12 |
| 8,362,863 B2 * | 1/2013 | Rochford | ............ | H01F 13/003 310/156.01 |
| 2002/0140308 A1 * | 10/2002 | Inayama | ............... | H02K 1/278 310/156.47 |
| 2004/0206422 A1 * | 10/2004 | Sakaguchi | ............ | H01F 13/003 148/301 |
| 2014/0139079 A1 * | 5/2014 | Kato | ..................... | H02K 21/16 310/68 B |

FOREIGN PATENT DOCUMENTS

| | | |
|---|---|---|
| JP | 2004056835 A | 2/2004 |
| KR | 20000044134 A | 7/2000 |

* cited by examiner

Primary Examiner — Mohamad Musleh
(74) Attorney, Agent, or Firm — John D. Russell

(57) ABSTRACT

Provided is a device for magnetizing a ring-shaped magnet for a brushless direct current (BLDC) motor, including: a rotor having a ring-shaped magnet installed on an outer peripheral surface of a rotor core; and a plurality of magnetizing yokes disposed so as to be spaced apart from each other by a predetermined interval while facing an outer peripheral surface of the ring-shaped magnet, magnetizing the ring-shaped magnet to form even-numbered unit magnets, and magnetizing the ring-shaped magnet only in regions except for one end and the other end of the unit magnets.

2 Claims, 2 Drawing Sheets

DEVICE FOR MAGNETIZING RING-SHAPED MAGNET FOR BLDC MOTOR

CROSS-REFERENCE TO RELATED APPLICATIONS

This application claims priority under 35 U.S.C. §119 to Korean Patent Application No. 10-2014-0078274, filed on Jun. 25, 2014, in the Korean Intellectual Property Office, the disclosure of which is incorporated herein by reference in its entirety.

TECHNICAL FIELD

The following disclosure relates to a device for magnetizing a ring-shaped magnet for a brushless direct current (BLDC) motor.

BACKGROUND

A brushless direct current (BLDC) motor is generally divided into a core type BLDC motor (or radial gap type BLDC motor) having a cup (cylindrical) structure and a coreless type BLDC motor (or axial gap type BLDC motor) depending on whether or not a stator core is present.

The core type BLDC motor is classified into an inner ring-shaped magnet type BLDC motor including a cylindrical stator having a coil wound therearound in order to have an entire ring type magnet structure on a plurality of protrusions (teeth) formed on an inner peripheral portion thereof and a rotor configured of a cylindrical permanent ring-shaped magnet and an outer ring-shaped magnet type BLDC motor including a stator having a coil wound around a plurality of protrusions (teeth) formed on an outer peripheral part thereof in a vertical direction and a rotor configured of a cylindrical permanent ring-shaped magnet multi-pole magnetized at an outer portion thereof.

Since the core type BLDC motor includes a magnetic circuit having a symmetrical structure in a radial direction based on a shaft, the core type BLDC motor has low axial vibration noise, is appropriate for low speed rotation, and has a very small portion occupied by an air gap in a direction of a magnetic path. Therefore, even though a ring-shaped magnet having low performance is used or a volume of a ring-shaped magnet is decreased, a high magnetic flux density may be obtained, such that a torque is large and efficiency is high.

Meanwhile, the ring-shaped magnet installed in the BLDC motor is subjected to a magnetizing process in order to drive the motor and generate a frequency.

FIG. 1 is a schematic view of a device for magnetizing a ring-shaped magnet for a BLDC motor according to the relate art.

As illustrated in FIG. 1, the device for magnetizing a ring-shaped magnet for a BLDC motor according to the relate art is configured to include a rotor 10 including a rotor core 12 having a shaft 11 inserted thereinto and a ring-shaped magnet 20 installed on an outer peripheral surface of the rotor core; and a plurality of magnetizing yokes 30 installed so as to face an outer peripheral surface of the ring-shaped magnet.

Here, a magnetizing voltage is applied to the magnetizing yokes 30, such that a magnetic flux is generated through a magnetizing iron core, and even-numbered unit magnets 21 are magnetized in the ring-shaped magnet 20 by the magnetic flux.

The even-numbered unit magnets 21 are coupled to each other, such that one of them may have magnetism of an S pole and the other of them may have magnetism of an N pole.

FIG. 2 is a graph illustrating magnetic flux densities of unit magnets formed by magnetizing the ring-shaped magnet for a BLDC motor according to the relate art depending on an electrical degree.

A portion illustrated by electrical degrees from 0 degree to 180 degrees at the left of the graph of FIG. 2 is a graph illustrating a magnetic flux density of a unit magnet having magnetism of an N pole depending on an electrical degree, the electrical degrees from 0 degree to 180 degrees in FIG. 2 mean portions from one end of the unit magnet having the magnetism of the N pole to the other end thereof, and electrical degrees from 180 degrees to 360 degrees mean portions from one end of a unit magnet having magnetism of an S pole to the other end thereof.

Referring to FIG. 2, it may be confirmed that 'dead zones' in which a magnetic flux density is rapidly changed are generated in one end and the other end of the unit magnet having the magnetism of the N pole and one end and the other end of the unit magnet having the magnetism of the S pole.

Therefore, according to the related art, there is a problem that a cogging phenomenon and a torque ripple phenomenon, which are rotation hunting phenomena of the ring-shaped magnet due to a rapid change in a magnetic resistance caused by the 'dead zones' of the even-numbered unit magnets configuring the ring-shaped magnet, occurs.

Therefore, the development of various devices for magnetizing a ring-shaped magnet for a BLDC motor for solving the above-mentioned problem has been demanded.

As a technology associated with this, a device for magnetizing a motor magnet has been suggested in Korean Patent Laid-Open Publication No. 2000-0044134.

RELATED ART DOCUMENT

Patent Document (Patent Document 1) Korean Patent Laid-Open Publication No. 2000-0044134 (published on Jul. 15, 2000).

SUMMARY

An embodiment of the present invention is directed to providing a device for magnetizing a ring-shaped magnet for a brushless direct current (BLDC) motor capable of minimizing a cogging phenomenon and a torque ripple phenomenon, which are rotation hunting phenomena of the ring-shaped magnet by alleviating rapid changes in magnetic flux densities in one end and the other end of unit magnets configuring the ring-shaped magnet.

In one general aspect, a device for magnetizing a ring-shaped magnet for a BLDC motor includes: a rotor 100 having a ring-shaped magnet 200 installed on an outer peripheral surface of a rotor core 120; and a plurality of magnetizing yokes 300 disposed so as to be spaced apart from each other by a predetermined interval while facing an outer peripheral surface of the ring-shaped magnet 200, magnetizing the ring-shaped magnet 200 to form even-numbered unit magnets 210, and magnetizing the ring-shaped magnet only in regions except for one end and the other end of the unit magnets 210.

A magnetizing angle of the magnetizing yoke 300 for the unit magnet 210 may be 0.7 to 0.8 times the pole pitch of the unit magnet 210.

An inner peripheral surface of the magnetizing yoke 300 may be formed in a form corresponding to an inner peripheral surface of the unit magnet 210.

The magnetizing yoke 300 may have a ruggedness formed on an inner peripheral surface thereof.

DETAILED DESCRIPTION OF MAIN ELEMENTS

Figure 1:
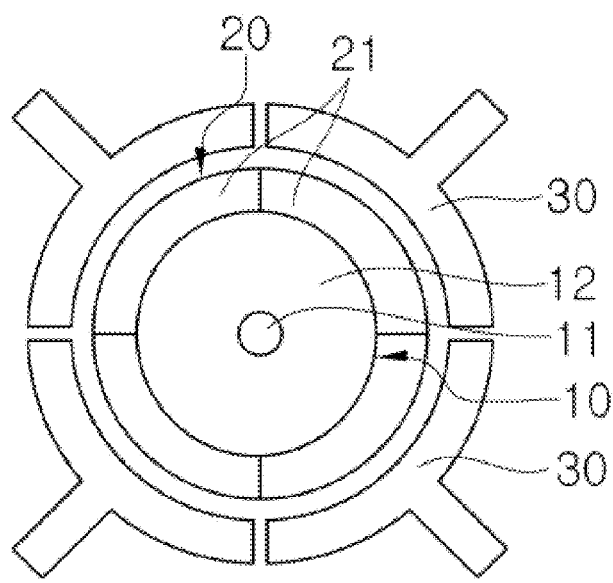
FIG. 1 is a schematic view of a device for magnetizing a ring-shaped magnet for a brushless direct current (BLDC) motor according to the relate art.
Figure 2:
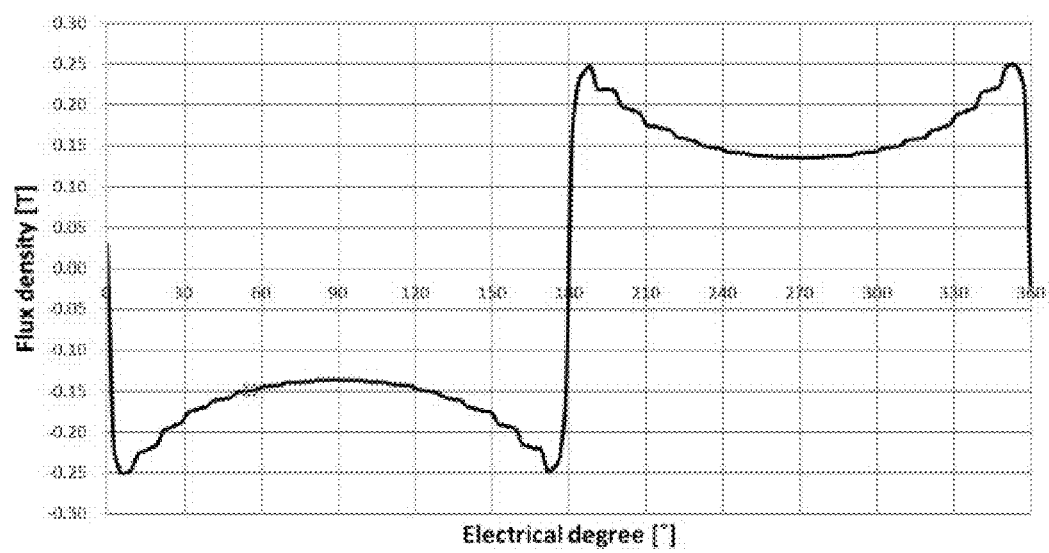
FIG. 2 is a graph illustrating magnetic flux densities of unit magnets formed by magnetizing the ring-shaped magnet for a BLDC motor according to the relate art depending on an electrical degree.

100: rotor
110: shaft
120: rotor core
200: ring-shaped magnet
210: unit magnet
300: magnetizing yoke

DETAILED DESCRIPTION OF EMBODIMENTS

Hereinafter, a technical spirit of the present invention will be described in more detail with reference to the accompanying drawings.

The accompanying drawings are only examples illustrated in order to describe the technical idea of the present invention in more detail. Therefore, the technical idea of the present invention is not limited to forms of the accompanying drawings.

Figure 3:
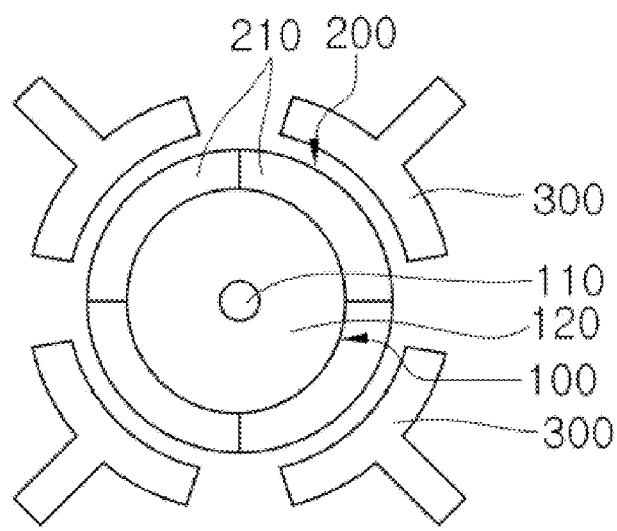
FIG. 3 is a schematic view of a device for magnetizing a ring-shaped magnet for a BLDC motor according to an exemplary embodiment of the present invention.

FIG. 3 is a schematic view of a device for magnetizing a ring-shaped magnet 200 for a brushless direct current (BLDC) motor according to an exemplary embodiment of the present invention.

As illustrated in FIG. 3, the device for magnetizing a ring-shaped magnet 200 for a BLDC motor according to the exemplary embodiment of the present invention is configured to include a rotor 100, a ring-shaped magnet 200, and magnetizing yokes 300.

The rotor 100 is configured to include a shaft 110 and a rotor core 120.

The shaft 110 is hinge-coupled to a driving shaft (not illustrated) of the motor.

The rotor core 120 is coupled to an outer peripheral surface of the shaft 110, and may be made of aluminum or plastic in order to minimize expansion due to thermal expansion.

In addition, rubber or silicon resin for absorbing a sound may be coupled to an inner peripheral surface and an outer peripheral surface of the rotor core 120.

The ring-shaped magnet 200 is installed on the outer peripheral surface of the rotor core 120, and may be made of a ferromagnetic substance.

The magnetizing yokes 300 are disposed so as to be spaced apart from each other by a predetermined interval while facing an outer peripheral surface of the ring-shaped magnet 200, magnetize the ring-shaped magnet 200 to form even-numbered unit magnets 210, and magnetize the ring-shaped magnet 200 only in regions except for one end and the other end of the unit magnets 210.

Here, rapid changes in magnetic flux densities in one end and the other end of the unit magnets 210 are alleviated, thereby making it possible to alleviate occurrence of a cogging phenomenon and a torque ripple phenomenon, which are rotation hunting phenomena of the ring-shaped magnet 200 due to rapid changes in magnetic resistances of the unit magnets 210 in the ring-shaped magnet 200.

This will be described in more detail.

Figure 4:
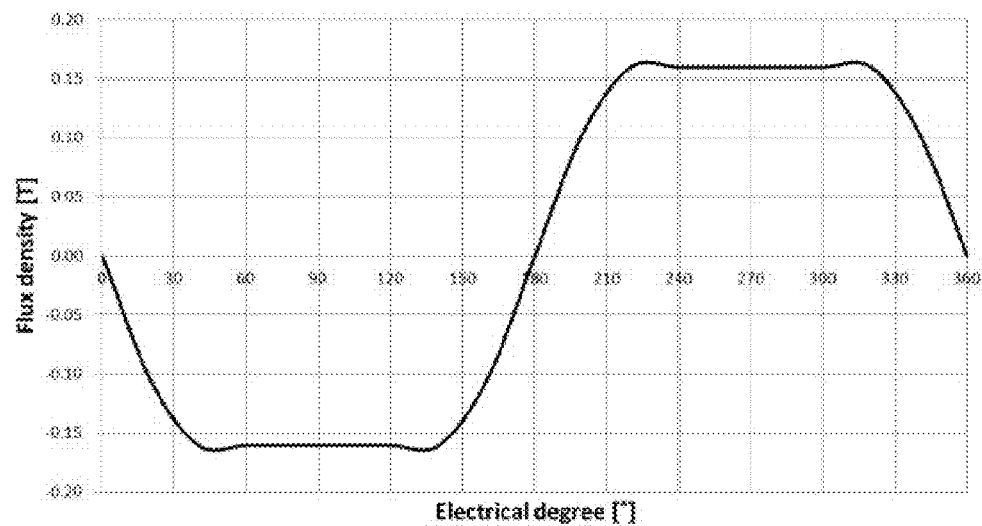
FIG. 4 is a graph illustrating magnetic flux densities of unit magnets formed by magnetizing the ring-shaped magnet for a BLDC motor according to the exemplary embodiment of the present invention depending on an electrical degree.

FIG. 4 is a graph illustrating magnetic flux densities of unit magnets 210 formed by magnetizing the ring-shaped magnet 200 for a BLDC motor according to the exemplary embodiment of the present invention depending on an electrical degree. Electrical degrees from 0 degree to 180 degrees in FIG. 4 mean portions from one end of the unit magnet 210 having magnetism of an N pole to the other end thereof, and electrical degrees from 180 degrees to 360 degrees mean portions from one end of the unit magnet 210 having magnetism of an S pole to the other end thereof.

Referring to FIG. 4, in the unit magnets 210 formed by magnetizing the ring-shaped magnet 200 for a BLDC motor according to the exemplary embodiment of the present invention, it may be confirmed that rapid changes in the magnetic flux densities are alleviated in one end and the other end of the unit magnet 210 having the magnetism of the N pole and one end and the other end of the unit magnet 210 having the magnetism of the S pole.

Therefore, it may be confirmed that the rapid changes in the magnetic flux densities in one end and the other end of the unit magnets 210 are alleviated, thereby making it possible to alleviate the occurrence of the cogging phenomenon and the torque ripple phenomenon, which are the rotation hunting phenomena of the ring-shaped magnet 200 due to the rapid changes in the magnetic resistances of the unit magnets 210 in the ring-shaped magnet 200.

In addition, it may be confirmed that magnetic flux densities from one end of the unit magnet 210 having the magnetism of the N pole to the other end thereof and magnetic flux densities from one end of the unit magnet 210 having the magnetism of the S pole to the other end thereof are constantly maintained.

Therefore, it may be confirmed that the magnetic flux densities from one end of the unit magnets 210 to the other end thereof are also constantly maintained, such that the magnetic resistances of the unit magnets 210 in the ring-shaped magnet 200 are constantly maintained, thereby making it possible to alleviate the occurrence of the cogging phenomenon and the torque ripple phenomenon, which are the rotation hunting phenomena of the ring-shaped magnet 200.

Meanwhile, the magnetizing yoke 300 may be configured so that a magnetizing angle thereof for the unit magnet 210 is 0.7 to 0.8 times the pole pitch of the unit magnet 210.

That is, only a region corresponding to 70 to 80% of the pole pitch of the unit magnet 210 is magnetized.

In addition, an inner peripheral surface of the magnetizing yoke 300 may be formed in a form corresponding to an inner peripheral surface of the unit magnet 210.

That is, only a portion of an entire region of the pole pitch of the unit magnet 210 is magnetized.

In addition, the magnetizing yoke 300 may have a ruggedness formed on the inner peripheral surface thereof.

In the case in which the ruggedness is formed on the inner peripheral surface of the magnetizing yoke 300, a strength at which the magnetizing yoke 300 magnetizes the ring-shaped magnet 200 is weakened to weaken a magnetic flux density of the unit magnet, thereby making it possible to weaken the cogging phenomenon and the torque ripple phenomenon, which are the rotation hunting phenomena of the ring-shaped magnet.

Therefore, the device for magnetizing a ring-shaped magnet for a BLDC motor according to the exemplary embodiment of the present invention includes the plurality of magnetizing yokes magnetizing the ring-shaped magnet to form the even-numbered unit magnets and magnetizing the ring-shaped magnet only in the regions except for one end and the other end of the unit magnets to alleviate the rapid changes in the magnetic flux densities in one end and the other end of the even-numbered unit magnets configuring the ring-shaped magnet, thereby making it possible to minimize the cogging phenomenon and the torque ripple phenomenon, which are the rotation hunting phenomena of the ring-shaped magnet.

The present invention is not limited to the above-mentioned exemplary embodiments, and may be variously applied, and may be variously modified without departing from the gist of the present invention claimed in the claims.

What is claimed is:

1. A device for magnetizing a ring-shaped magnet for a brushless direct current (BLDC) motor, comprising:
    a rotor having a ring-shaped magnet installed on an outer peripheral surface of a rotor core; and
    a plurality of magnetizing yokes disposed so as to be spaced apart from each other by a predetermined interval while facing an outer peripheral surface of the ring-shaped magnet, magnetizing the ring-shaped magnet to form even-numbered unit magnets, and magnetizing the ring-shaped magnet only in regions except for one end and the other end of the unit magnets;
    wherein a magnetizing angle of the magnetizing yoke for the unit magnet is 0.7 to 0.8 times a pole pitch of the unit magnet.
2. The device for magnetizing the ring-shaped magnet for the BLDC motor of claim 1, wherein the magnetizing yoke has a ruggedness formed on an inner peripheral surface thereof.

* * * * *